United States Patent [19]

Göransson

[11] 3,976,205

[45] Aug. 24, 1976

[54] SUCTION DEVICE FOR GRASPING AND HANDLING A GENERALLY PARALLELEPIPEDIC BODY

[75] Inventor: Rolf Erik Göransson, Akarp, Sweden

[73] Assignee: Internationella Siporex Aktiebolaget, Malmo, Sweden

[22] Filed: Mar. 14, 1975

[21] Appl. No.: 558,587

[30] Foreign Application Priority Data

Mar. 21, 1974 Sweden ............................ 7403859

[52] U.S. Cl. ........................ 214/1 QD; 214/650 SG; 294/64 R

[51] Int. Cl.[2] ........................................... B65G 7/00

[58] Field of Search ........... 214/1 BV, 1 QD, 1 QG, 214/147 R, 147 T, 1 Q, 1 LM, 1 H, 1 D; 294/64 R, 86 LS

[56] References Cited

UNITED STATES PATENTS 3,139,301 6/1964 Olson .......................... 214/650 SG

FOREIGN PATENTS OR APPLICATIONS 1,246,485 9/1971 United Kingdom .............. 294/64 R

*Primary Examiner*—L. J. Paperner
*Assistant Examiner*—George F. Abraham
*Attorney, Agent, or Firm*—Fred Philpitt

[57] ABSTRACT

A suction device for grasping and turning over generally parallelepipedic bodies has two suction faces for adhesion to each one of two adjoining surfaces of the body and is oscillatable relative to a carrier about a horizontal axis that is parallel to both said faces. Preferably the two suction faces are provided on a pair of separate but jointly oscillatable suction head members which are adjustable relative to each other.

9 Claims, 13 Drawing Figures

SUCTION DEVICE FOR GRASPING AND HANDLING A GENERALLY PARALLELEPIPEDIC BODY

This invention relates to a suction device for grasping and handling a generally parallelepipedic body, especially a body of still unhardened cellular lightweight concrete mass, comprising a first suction head member having a first suction face adapted for releasable suctorial adhesion to a first surface of the body that is originally the top thereof, said first suction head member being supported by a carrier in a manner permitting its swinging in relation to the carrier about a generally horizontal axis.

By means of previously known devices of this kind it is only possible to deposit the grasped body in a position, in which its original bottom side is still facing downwards. In many cases this is unsatisfactory. For instance, in the manufacture of cellular lightweight concrete products it is frequently desirable to transfer a large, generally parallelepipedic body of solidified but still unhardened and, hence, semi-plastic cellular concrete mass from one support to another and, in connection therewith, to turn over the body in order to lay it down on its side to thereby facilitate a subsequent treatment of the body.

It is an object of the present invention to provide a suction device of the kind referred to hereinbefore, which in connection with taking over the body from a support permits such a turning over or tipping of the body before the latter is again deposited on the same or, preferably, a second support.

According to the invention this object is achieved by an improved suction device of the kind referred to which is mainly characterized by the provision of a second suction head member that is also swingably supported by said carrier and has a second suction face adapted for releasable suctorial adhesion to a second surface of the body that is originally a laterally facing side thereof, and by the further provision of means for oscillating said first and second suction head members jointly relative to said carrier at least approximately 90° about a generally horizontal axis that is at least substantially parallel to both said first and second suction faces, the suction device as a hole being designed in a manner to leave those two adjoining surfaces of the body, which are opposite to the first and second surfaces thereof, entirely free.

In such an improved suction device the two suction head members with their respective suction faces will be capable of such a favorable co-operation in grasping and securely holding the body during its turning over that no further body gripping or body retaining means are required. In fact, during the oscillation of the two suction head members together with the grasped body the main part of the body weight will be gradually transferred from one suction face to the other, and only a moderate negative pressure that is entirely harmless even to a semi-plastic and highly damageable body will be needed to assure a reliable holding of the body in all those positions which it will pass during turning.

Figure 1:
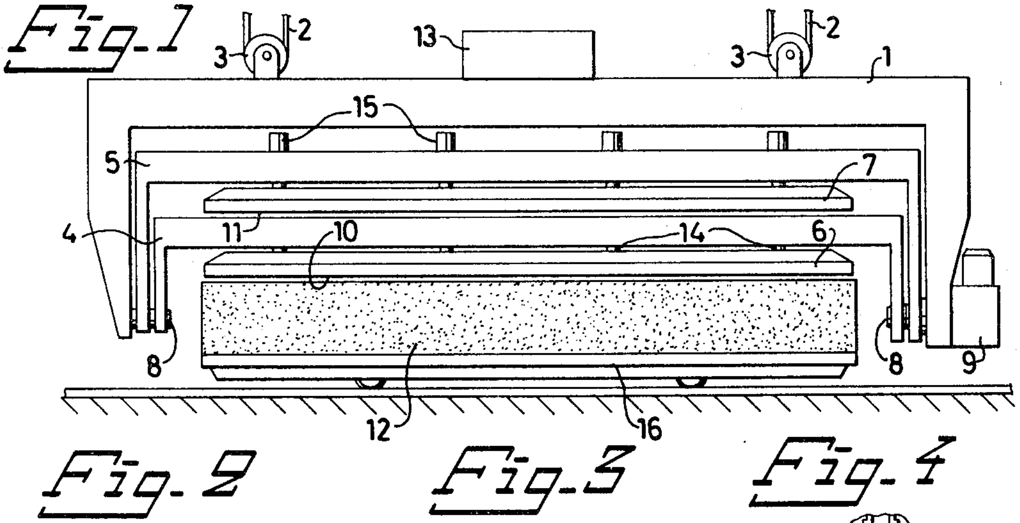
Figure 2:
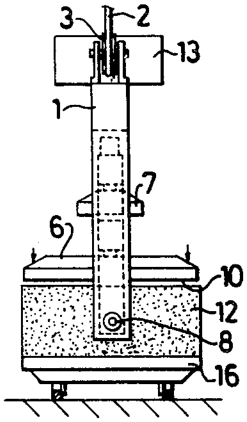
Figure 3:
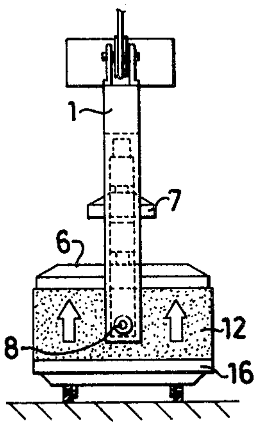

For further elucidation of the invention two embodiments thereof will now be described with reference to the accompanying drawings. In the drawings FIG. 1 is a side view of a first form of a suction device embodying the invention, the device being shown in a still inoperative position in which it is preparatory suspended over a body to be grasped, lifted and turned, FIG. 2 is an end view of the same suction device as seen from the left in FIG. 1, FIG. 3 illustrates in a manner similar to that of FIG. 2 a first operating step of the suction device, in which a first suction head member of the device has been brought into contact with the top of the body to make possible a lifting of the body from its support, FIG. 4 illustrates a second operating step, in which the body has been lifted from its support and a second suction head member of the device is on its way towards an operative position, FIG. 5 shows the device with the second suction head member in a preparatory position ready for being brought into contact with one longitudinal side surface of the body, FIG. 6 shows the device with both its two suction head members operative, the turning movement of the body having just started, and FIG. 7 shows the device when the turning over of the body has been completed and the body is ready for deposition on a second support in a position standing on its narrow side.

Figure 8:
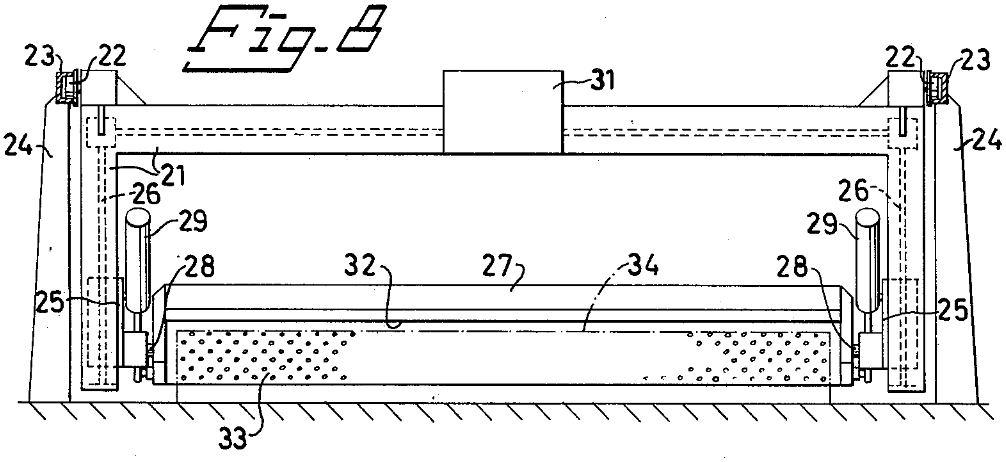
Figure 9:
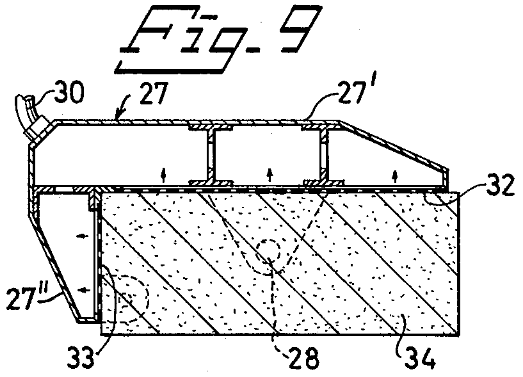
Figure 10:
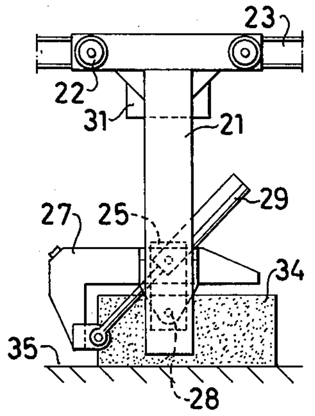
Figure 11:
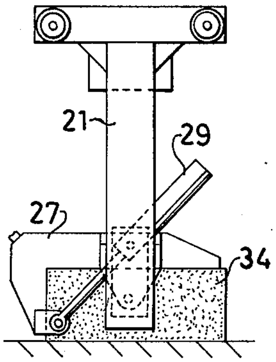
Figure 12:
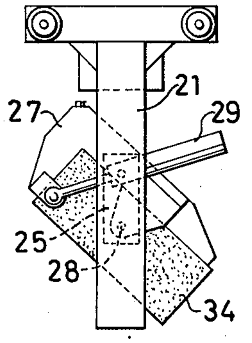
Figure 13:
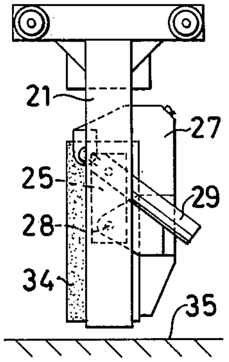

FIG. 8 is a side view of a modified suction device embodying the invention,

FIG. 9 is a cross sectional elevation on an enlarged scale of the combined suction head members of the device in FIG. 8, FIG. 10 shows the modified device as seen from the left in FIG. 8 and ready for contact with a body to be grasped, lifted and turned over, FIG. 11 illustrates in a manner similar to that of FIG. 10 a first operating step of the device, in which the combined suction head members have just been moved into contact with the body, FIG. 12 illustrates a second operating step, in which the combined suction head members of the device have grasped and raised the body from its support and turned it approximately half-way about the horizontal axis, and FIG. 13 shows the modified device in a position in which the turning movement has been completed and the body is ready for deposition on a second support.

Figure 4:
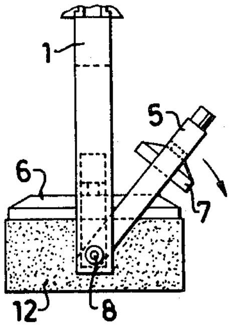
Figure 5:
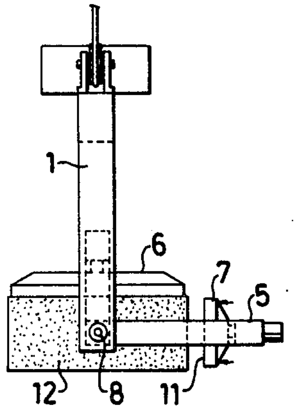
Figure 6:
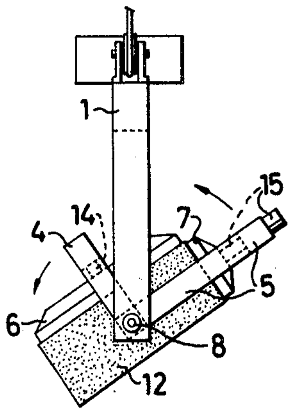
Figure 7:
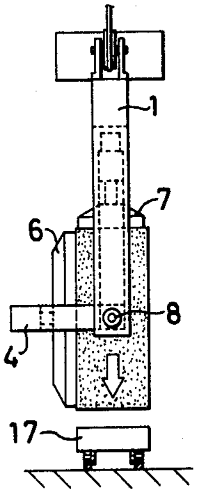

The suction device shown in FIGS. 1–7 comprises a yoke-like carrier 1, which by means of ropes 2 running over pulleys 3 is adjustably suspended, e.g. from an overhead travelling carriage, not shown, that makes possible a movement of the carrier 1 also in a horizontal direction. The carrier 1 supports between its downwardly directed shanks two yoke members 4 and 5, one inside the other, and each of said yoke members supports in its turn one of two suction head members 6 and 7, respectively. The two yoke members 4 and 5 have their respective shank ends oscillatably connected to the shank ends of the carrier by means of coaxial pivots 8, which together define a horizontal turning axis. A driving mechanism 9 makes possible, as and when required, a positive individual or joint oscillation of the yoke members 4 and 5 about the pivots 8 as will appear from the following. Each suction head member 6 and 7, respectively, has a suction face 10 and 11, respectively, which is at least substantially parallel to the common axis of oscillation defined by the two pivots 8 and is movable into contact with each one of two adjoining surfaces of the parallelepipedic body 12 to be lifted and turned over, viz. the top and one longitudinal laterally facing side thereof. Each of the two suction head members is, through suction conduits and a control valve, not shown, connected to a suitable vacuum source 13. The suction head member 6 is attached to and supported by its related yoke member 4 through a number of adjustment means 14, preferably in the form of hydraulic piston-cylinder-actuators, permitting adjustment of the suction face 10 towards and away from the body 12, and in a similar manner the suction head member 7 is attached to and supported by its related yoke member 5 through a number of adjustment means 15 of a similar kind permitting adjustment of the suction face 11 towards and away from the body. The adjustment means 14 and 15 are settable in any adjusted position in order to prevent an inadvertent displacement of the related suction head member, when the latter has become operative, i.e. properly adheres to the body 12. The adjustment means 15 have a longer stroke towards and away from the common axis of oscillation of the two yoke members than the adjustment means 14 to let the head member 7 clear the head member 6 when being swung into and out of its inoperative position as illustrated in FIG. 4.

The two suction head members 6 and 7 have both the same length counted in the longitudinal direction of the device but the width of the head member 7 is smaller than that of the head member 6. This is, of course, because the body 12 to be handled has a rectangular rather than a fully square cross section and because it is preferred to let each of the two suction faces 10 and 11 cover an area of the related body surface that is as large as possible. On the other hand, the suction head members do not project beyond their related surfaces of the body 12. Furthermore, the yoke member 5 with its related suction head member 7 can be swung into an inoperative position above the yoke member 4 and the suction head member 6 as can be seen from FIGS. 1 and 2 to thereby be entirely out of the way during the preliminary lifting of the body 12 from its first support 16, which in the example shown is a platform truck but which may be any suitable bed. After having been lifted and turned over and after having been possibly moved horizontally in connection therewith, the body 12 is supposed, in the example shown, to be deposited on its edge on a second truck 17 (FIG. 7), but, of course, there is nothing to prevent the suction device from lifting the body from and subsequently depositing it onto one and the same support which may even be vertically movable instead of the carrier 1, if desired.

The suction device illustrated in FIGS. 1–7 is suitably used in the following manner: When the carrier 1 has been lowered into a preparatory position as shown in FIGS. 1 and 2, in which the downwardly facing suction face 10 of the suction head member 6 is only a short distance above the top of the body 12, the head member 6 is, by actuation of its adjustment means 14, brought into intimate contact with the top of the body and connected to the vacuum source 13, whereby its suction face 10 will firmly adhere to the body (FIG. 3). In this operative position the head member 6 is locked relative to its yoke member 4 and, hence, prevented from inadvertant further movement in relation thereto. Then the carrier 1 is elevated, or the support 16 lowered, so that the grasped body is separated from the support 16. At the same time the yoke member 5 with its related suction head member 7 starts swinging laterally downwards (FIG. 4) into a substantially horizontal position (FIG. 5), in which the suction face 11 of the suction head member 7 comes in front of that vertical longitudinal side of the body 12 against which it is intended to be subsequently applied. When also the suction head member 7, by actuation of the adjustment means 15, has been brought into intimate contact with the body 12 and has been properly connected to the vacuum source and locked in its operative position relative to its yoke member 5, the driving mechanism 9 is again started to cause the two yoke members 4 and 5 with their related suction head member 6 and 7 to swing jointly and synchronously in order to turn the body 12 about the axis defined by the pivots 8 (FIG. 6). When the turning movement is completed, the body 12 is ready for deposition, in a position standing on its edge, onto the truck 17 by lowering 15 the carrier 1 (FIG. 7), or elevating the truck. As soon as the body rests properly on the new support, the two suction head members 6 and 7 are disconnected from the vacuum source 13 and instead connected to the atmosphere, whereupon the adjustment means 14 and 15l may be actuated to remove the suction head members from the body, before the suction device is finally returned to its starting position to be ready to repeat its cycle of operation, the various parts of the device then being, of course, restored to their original positions as shown in FIGS. 1 and 2.

Although it is possible to do without the adjustment means 14 for the suction head member 6 and to bring the suction face 10 into contact with the top of the body 12 solely by lowering the carrier 1, the structure and procedure described hereinbefore is preferred, because they reduce the risk of damaging the body. In addition, the adjustment means 14 make it possible to use the described suction device in a substantially and analogous manner for grasping a body that is standing on its edge and for depositing said body on one of its main sides.

The embodiment of the invention shown in FIGS. 8–13 comprises a yoke-like carrier 21, which is provided with wheels 22 and is movable horizontally on and along runways 23 supported by columns 24. The downwardly directed shanks of the carrier 1 are formed as guides for each one of two slides 25, which are vertically movable in synchronism by means of screws 26 connected to a common driving motor, not shown. The two slides 25 carry between them an angular hook-like suction unit 27, which is, in fact, a rigid combination of two suction head members 27' and 27''. The unit 27 is oscillatable about a horizontal axis defined by two pivots 28, one on each slide, and between each slide 25 and a fixture on the suction head member 27'' there is provided an actuator 29 of the piston-cylinder-type for positively swinging the unit 27. The unit 27, which through a suction conduit indicated at 30 in FIG. 9 and a suitable valve, not shown, is connectable either to a vacuum source 31 or to the surrounding atmosphere, as required, is provided with two suction faces 32 and 33, respectively, one for each suction head member, and these two suction faces form a substantially right angle between them, so that they may be applied against the top and one vertical longitudinal side, respectively, of a body 34 to be grasped and handled. The body 34, which is originally resting on a support 35, has a rectangular cross section, and the size of the two suction faces 32 and 33 is large enough to let each suction face cover a considerable part of the related one of the two adjoining body sides without extending beyond the same.

As shown in FIGS. 10–13 the modified device is used in the following manner: By moving the carrier 21 and lowering the slides 25, the two suction faces 32 and 33 of the suction unit 27 are both brought into contact with the body 34 (FIG. 11). This is facilitated, if the suction face 33 is first moved into contact with the vertical longitudinal side of the body, before the unit 27 is finally lowered to place the suction face 32 in contact with the body top, which latter movement is preferably effected subsequent to a connection of the suction unit to the vacuum source 31. As soon as the body 34 has thus been firmly grasped by suction, the unit 27 together with the body is lifted, by elevating the slides 25 by means of the screws 26, to such a level that an unimpeded turning of the unit about the pivots 28 can take place, the turning being effected by synchronous operation of the two actuators (29) (FIG. 12). When the body 34 has reached its upright position (FIG. 13), the suction unit 27 is again lowered to deposit the body on the support 35 in its new position, possibly in a place remote from that, where the body was originally picked up.

It is to be understood that the modified device shown in FIGS. 8–13 can only be used in those cases, where both the top of the body and at least one longitudinal side surface thereof are simultaneously accessible, when the body is to be grasped, whereas the device shown in FIGS. 1–7 is useful also when only the top, i.e. the originally upper face, of the body is free and accessible. In addition, the device shown in FIGS. 8–13 is highly dependent on an accurate body shape. In both cases the axis, about which the body is turned, extends through the body and in the vicinity of the center of gravity of that oscillatable unit, of which the grasped body forms a part, which means that only moderate forces are required to turn the grasped body.

I claim:

1. A suction device for grasping and handling a generally parallelepipedic body comprising:

a. means forming a first suction head member having a first suction face adapted for releasable suctorial adhesion to a first surface of the body that is originally the top thereof, b. means forming a second suction head member having a second suction face adapted for releasable suctorial adhesion to a second surface of the body that is originally a laterally facing side thereof, c. carrier means common to said first and second suction head members, d. means for oscillating said first and second suction head members jointly relative to said carrier means at least approximately 90° about a generally horizontal axis that is at least substantially parallel to both said first and second suction faces, and e. means for temporarily creating a negative pressure in said first and second suction head members, said suction device leaving two adjoining surfaces of the body opposite to the first and second surfaces thereof, respectively, entirely free so as to permit turning over of the grasped body and depositing of the same on that free side thereof which was formerly facing laterally and away from the second body surface.

2. A suction device according to claim 1 wherein said first and second suction head members are separate and adjustable relative to each other.

3. A suction device according to claim 1 wherein at least one of said first and second suction head members is adjustable relative to the other one by turning about an axis that is parallel to said common axis of joint oscillation of the two suction head members.

4. A suction device according to claim 1 wherein at least one of said first and second suction head members is adjustable relative to the other one by turning about said common axis of joint oscillation of the two suction head members.

5. A suction device according to claim 1 wherein at least one of said first and second suction head members is adjustable towards and away from said common axis of joint oscillation of the two suction head members,

6. A suction device according to claim 1 wherein said first and second suction head members are rigidly interconnected to oscillate as a unit relative to said carrier means, and wherein said first and second suction faces form an angle of at least approximately 90° between them.

7. A suction device for grasping and handling a generally parallelepipedic body comprising:

a. means forming a first suction head member having a first suction face adapted for releasable suctorial adhesion to a first surface fo the body that is originally the top thereof, b. means forming a second suction head member having a second suction face adapted for releasable suctorial adhesion to a second surface of the body that is originally a laterally facing side thereof, c. carrier means common to said first and second suction head members, d. a first yoke member supporting said first suction head member, e. a second yoke member supporting said second suction head member, f. means for oscillating said first and second yoke members and, hence, said first and second suction head members individually as well as jointly relative to said carrier means about a common, generally horizontal axis that is at least substantially parallel to both said first and second suction faces and located at a distance from and in front of both of them, and g. means for temporarily maintaining a negative pressure in each of said first and second suction head members in order to cause their suction faces to adhere to the body separately or jointly, as required.

8. A suction device according to claim 7 wherein at least one of said first and second suction head members is attached to its related yoke member by means permitting adjustment of the head member towards and away from said common axis of oscillation of the two yoke members.

9. A suction device according to claim 7 wherein each of said first and second suction head members is attached to its related yoke member by adjustment means permitting convenient variation and setting of the distance between said common axis of oscillation of the two yoke members and the suction face of the head.

* * * * *